United States Patent Office 2,862,858
Patented Dec. 2, 1958

2,862,858

PURIFICATION OF ISOPROPYLNAPHTHALENE

Joshua C. Conner, Jr. and Herman I. Enos, Jr., Wilmington, Del., assignors to Hercules Powder Company, Wilmington, Del., a corporation of Delaware No Drawing. Application June 29, 1953
Serial No. 364,973

10 Claims. (Cl. 202—57)

This invention relates to the air oxidation of $\beta$-isopropylnaphthalene for the production of the hydroperoxide therefrom and more particularly to the purification of the $\beta$-isopropylnaphthalene for use in the air oxidation process.

In the process for preparing $\beta$-naphthol by oxidation of $\beta$-isopropylnaphthalene to the hydroperoxide and subsequent cleavage of the hydroperoxide to $\beta$-naphthol, the most critical step with respect to rate of production lies in the oxidation step. Unexplained induction periods of varying duration are common and in some instances the reaction may begin and then suddenly stop. In other instances it is impossible to start the oxidation even by the use of catalysts and initiators.

In accordance with the present invention, it has now been found that $\beta$-isopropylnaphthalene is made more active toward oxidation with molecular oxygen by a combination of contacting the $\beta$-isopropylnaphthalene with an alkali metal hydroxide and subjecting the treated $\beta$-isopropylnaphthalene to distillation to remove constituents boiling outside the range of $\alpha$- and $\beta$-isopropylnaphthalenes.

The purification process of this invention is equally effective on $\beta$-isopropylnaphthalene free of $\alpha$-isopropylnaphthalene or on $\beta$-isopropylnaphthalene admixed with $\alpha$-isopropylnaphthalene as it occurs in isopropylnaphthalene prepared by propylation of naphthalene. The process is particularly well adapted for purification of isopropylnaphthalene containing 30–95% $\beta$-isopropylnaphthalene. The term "isopropylnaphthalene" without designation as to isomer refers to the mixture of isomers.

The treatment with alkali metal hydroxide is carried out prior to the distillation or during the distillation. When the treatment of the isopropylnaphthalene is carried out as a separate step from the distillation step, the treatment of the isopropylnaphthalene is effected by intermixing the isopropylnaphthalene and alkali metal hydroxide preferably as a solution and separating the layers; or alternatively by contacting the alkali metal hydroxide and the isopropylnaphthalene with each other, either one or the other of the two being in the form of a dispersion; or is effected by other means such as passing the isopropylnaphthalene through a column packed with granular alkali metal hydroxide or with filling material having a surface coating of aqueous alkali metal hydroxide. The alkali metal hydroxide may also be used in a granulated or pulverized form and may be added to the isopropylnaphthalene in this form if desired.

The alkali metal hydroxide is preferably sodium hydroxide. The amount of the alkali metal hydroxide used in the process is from an effective amount, which is generally about 0.05%, to about 10%, the percentage being based on the weight of isopropylnaphthalene. The amount of alkali metal hydroxide used is based on the degree of purity of the isopropylnaphthalene. When the alkali metal hydroxide is used in solution, the concentration of the caustic with respect to the aqueous solution is preferably in the range of 4–40%. The concentration is preferably selected to suit the physical conditions or the means of contacting used. The alkali metal hydroxide is either separated before subjecting the isopropylnaphthalene to the distillation treatment or it is allowed to remain during distillation. The caustic treatment is preferably performed in an inert atmosphere.

The temperature of treatment with the alkali metal hydroxide is any temperature in the range of 20–200° C. The preferred temperature is 80–150° C.

The distillation treatment is carried out by distilling the isopropylnaphthalene at a temperature below about 200° C. with the isolation of a cut free of naphthalene and consisting essentially of material boiling in the range of $\alpha$- and $\beta$-isopropylnaphthalenes.

The distillation is preferably a reduced pressure distillation using a pressure below about 150 mm. The distillation is also advantageously carried out using steam to aid in the carrying over of the product at a temperature below 200° C. Contact with oxygen is avoided during the distillation and to this end an inert gas such as nitrogen, steam, or carbon dioxide may be used to displace any air that might be present. In distilling with steam a sufficiently broad cut of low boiling material is removed to insure the absence of naphthalene in the isopropylnaphthalene cut. When the alkali metal hydroxide treatment is carried on simultaneously with the distillation, as for instance, in distilling from sodium hydroxide, the distillation may be a steam distillation and steam is added, if desired, to maintain an aqueous solution of the caustic.

The distillation is also advantageously carried out in the presence of certain organic compounds boiling below the boiling point of naphthalene which compounds are capable of forming azeotropes with naphthalene, which azeotropes also boil lower than the boiling point of naphthalene. In such a process benzyl alcohol, tetrahydro furfuryl alcohol, glycerol, glycol, or other azeotrope former is advantageously used to aid in the separation of the naphthalene from the isopropylnaphthalene fraction. If no azeotrope former is used, and when glycerol or glycol is used as the azeotrope former, it is preferable to keep the column head heated to prevent crystallization of any naphthalene that may be in the forerun.

Steam distillation or azeotropic distillation may be used in the initial part of the distillation until naphthalene is substantially completely removed or either type of distillation may be used for the entire process. It is preferable to use steam or azeotropic distillation only for the first part of the distillation so as to permit more careful fractionation of the isopropylnaphthalene fraction.

The process for testing the activity of isopropylnaphthalene toward oxidation to determine the effectiveness of the purification treatment is as follows:

In a 1-liter flask fitted with a high speed stirrer is placed 500 g. of the isopropylnaphthalene to be tested, 100 g. 2.5% aqueous $Na_2CO_3$ solution and 3.9 g. 98.2% cumene hydroperoxide as an initiator. The mixture is heated to 90° C. and oxygen is passed in through a dispersion tube dipping below the surface of the isopropylnaphthalene at the rate of 100 cc. per minute for at least 20 hours, samples being taken at frequent intervals for analysis for hydroperoxide content. The rate of formation of isopropylnaphthalene hydroperoxide per hour is then calculated in percent formed per hour in the reaction mixture. The average rate after a constant rate has been established is used for comparison purposes.

*Example 1*

A sample of isopropylnaphthalene containing about 85% $\beta$-isopropylnaphthalene and showing an oxidation rate obtained in the manner described above of 0.25% per hour was distilled through a 20-plate column at 100 mm. pressure and a cut boiling in the range of 188.5–189.0 C. and analyzing about 85% β-isopropylnaphthalene was taken. This cut showed no improvement in its rate of oxidation. Another sample of this isopropylnaphthalene was stirred into a dispersion with 40% sodium hydroxide solution at about 50° C. After removal of the caustic, one portion was dried and found to have an oxidation rate of 0.26% per hour, and another portion was distilled through a 20-plate column at 100 mm. pressure taking a 188.5–189.0° C. cut analyzing about 85% β-isopropylnaphthalene. This latter caustic treated and distilled product showed an oxidation rate of about 0.48% per hour.

*Example 2*

A 37-gallon sample of the untreated isopropylnaphthalene of Example 1 was placed in a distillation pot along with about ½ lb. 40% sodium hydroxide solution and 2.5 gallons benzyl alcohol and distilled under a column of 20-plate efficiency at 100 mm. pressure. The water came over first leaving a suspension of caustic in the pot. The pot temperature was about 200° C. The distillate boiling in the range of 188.5–189.0° C. and analyzing about 85% β-isopropylnaphthalene was collected and tested for oxidation rate. The rate was found to average 0.49% per hour over the first 17.4 hours and 0.41% per hour over a 46.4 hour period.

*Example 3*

A 50.5 gallon sample of β-isopropylnaphthalene containing 2.7% α-isopropylnaphthalene showing an oxidation rate of 0.28% per hour was placed in a vessel with 2.75 gallons benzyl alcohol and about 1 gallon 40% sodium hydroxide solution and thoroughly stirred for an hour at 120° C. The caustic layer which settled on standing was then withdrawn and the organic layer was distilled at 100 mm. through a column of 20 theoretical plates. The distillation cut of β-isopropylnaphthalene boiling at 188.5° C. and analyzing 1.8% α-isopropylnaphthalene was shown to have an oxidation rate of 0.52% per hour average over a 42.4 hour period.

*Example 4*

A 50-gallon sample of untreated β-isopropylnaphthalene used in Example 3 was mixed with 1 gallon of 40% sodium hydroxide solution and sparged with steam and the distillate was passed through a 20-plate column having a heated head to prevent crystallization of naphthalene. After one gallon of organic distillate had come over the steam sparge was stopped, the caustic was removed and the distillation was continued without steam under reduced pressure. The fraction boiling at 188.0–189.0° C. was shown to have an oxidation rate of 0.45% per hour.

*Example 5*

A repetition of Example 4 using potassium hydroxide in place of sodium hydroxide gave a product of similar boiling range having an oxidation rate of 0.49% per hour.

While the process of this invention is particularly applicable to the mixed α- and β-isopropylnaphthalene obtained directly from the propylation of naphthalene, it is also adapted for treatment of isopropylnaphthalene recovered from an oxidation process in which part of the β-isopropylnaphthalene has been removed by conversion to the hydroperoxide by selective oxidation. Such an isopropylnaphthalene should, for the sake of safety, not contain more than about 2% hydroperoxide. The present process is particularly suitable for purification of isopropylnaphthalene containing oxidation products in small amounts and may include hydroperoxides among the oxidation products present as impurities.

It is also particularly good for purifying an isopropylnaphthalene mixture which has been subjected to isomerization by heating at about 200° C. with fuller's earth so as to increase the β-isopropylnaphthalene content and which is contaminated with naphthalene.

Unless otherwise indicated herein all percentages are by weight.

What we claim and desire to protect by Letters Patent is:

1. A process for treating isopropylnaphthalene containing α- and β-isopropylnaphthalene and naphthalene to increase the activity toward hydroperoxide-type oxidation of the β-isopropylnaphthalene contained therein, which comprises contacting the isopropylnaphthalene with an alkali metal hydroxide and fractionally distilling at a temperature below about 200° C. in the absence of molecular oxygen, and collecting a distillation cut free of naphthalene boiling in the range of isopropylnaphthalene.

2. The process of claim 1 in which the alkali metal hydroxide is sodium hydroxide.

3. The process of claim 1 in which the alkali metal hydroxide is in aqueous solution.

4. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide and subsequently fractionally distilling at a temperature below about 200° C. in the absence of molecular oxygen and collecting a distillation cut free of naphthalene boiling in the range of isopropylnaphthalene.

5. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide and subsequently fractionally distilling at a temperature below about 200° C. with an organic compound which boils below isopropylnaphthalene and forms an azeotrope with naphthalene in the absence of molecular oxygen, and collecting a distillation cut free of naphthalene boiling in the range of isopropylnaphthalene.

6. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide and simultaneously fractionally distilling at a temperature below about 200° C. in the absence of molecular oxygen and collecting a distillation cut free of naphthalene boiling in the range of isopropylnaphthalene.

7. A process of purifying isopropylnaphthalene containing α- and β- isopropylnaphthalene and naphthalene to increase the activity toward hydroperoxide-type oxidation of the β-isopropylnaphthalene contained therein which comprises contacting the isopropylnaphthalene with an alkali metal hydroxide and simultaneously fractionally distilling at a temperature below about 200° C. with an organic compound which boils below isopropylnaphthalene and forms an azeotrope with naphthalene in the absence of molecular oxygen, and collecting a distillation cut free of naphthalene boiling in the range of isopropylnaphthalene.

8. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide, steam distilling until naphthalene is substantially completely distilled off and then fractionally distilling at a temperature below about 200° C. in the absence of molecular oxygen and collecting a distillation cut free of naphthalene boiling in the range of isopropylnaphthalene.

9. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide while steam distilling until naphthalene is substantially completely distilled off and then fractionally distilling at a temperature below about 200° C. in the absence of molecular oxygen and collecting a distillation cut free of naphthalene boiling in the range of isopropylnaphthalene.

10. A process of purifying isopropylnaphthalene containing α- and β-isopropylnaphthalene and naphthalene to increase the activity toward hydroperoxide-type oxidation of the β-isopropylnaphthalene contained therein which comprises contacting the isopropylnaphthalene with an alkali metal hydroxide while steam distilling until naphthalene is substantially completely distilled off, separating the alkali metal hydroxide and fractionally distilling at a temperature below about 200° C. in the absence of molecular oxygen and collecting a distillation cut free of naphthalene boiling in the range of isopropylnaphthalene.

References Cited in the file of this patent

UNITED STATES PATENTS

| | | |
|---|---|---|
| 1,444,068 | Gibbs | Feb. 6, 1923 |
| 1,809,752 | Jaeger | June 9, 1931 |
| 2,288,126 | Dunn et al. | June 30, 1942 |
| 2,368,597 | Morris et al. | Jan. 30, 1945 |
| 2,462,103 | Johnson | Feb. 22, 1949 |
| 2,508,911 | Garner et al. | May 23, 1950 |
| 2,583,554 | Feldman et al. | Jan. 29, 1952 |
| 2,621,213 | Joris | Dec. 9, 1952 |
| 2,626,236 | Tatterson | Jan. 20, 1953 |
| 2,652,435 | Hess et al. | Sept. 15, 1953 |
| 2,652,436 | Hess et al. | Sept. 15, 1953 |

FOREIGN PATENTS

| | | |
|---|---|---|
| 549,516 | Great Britain | Nov. 25, 1942 |
| 996,425 | France | Oct. 29, 1951 |
| 506,773 | Canada | Oct. 26, 1954 |